(12) United States Patent
Cadio et al.

(10) Patent No.: US 7,924,370 B2
(45) Date of Patent: Apr. 12, 2011

(54) BACKLIGHT ASSEMBLY AND A LIQUID CRYSTAL DISPLAY DEVICE USING THE SAME

(75) Inventors: Michel Cadio, Carmel, IN (US); Estill Thone Hall, Jr., Fishers, IN (US); Brent Hoffman, Camby, IN (US)

(73) Assignee: TTE Technology Inc., Indianapolis, IN (US)

( * ) Notice: Subject to any disclaimer, the term of this patent is extended or adjusted under 35 U.S.C. 154(b) by 128 days.

(21) Appl. No.: 12/230,382

(22) Filed: Aug. 28, 2008

(65) Prior Publication Data

US 2010/0053495 A1    Mar. 4, 2010

(51) Int. Cl.
*G02F 1/1335* (2006.01)
*G02F 1/13357* (2006.01)
*F21V 7/04* (2006.01)

(52) U.S. Cl. ............ 349/65; 349/61; 362/561; 362/606; 362/610; 362/616

(58) Field of Classification Search .................... 349/65; 362/600, 610, 616, 561
See application file for complete search history.

(56) References Cited

U.S. PATENT DOCUMENTS

| 5,130,898 | A * | 7/1992 | Akahane ............... 362/632 |
| 5,949,505 | A * | 9/1999 | Funamoto et al. ............. 349/65 |
| 2005/0140848 | A1* | 6/2005 | Yoo et al. ............... 349/64 |
| 2007/0188677 | A1* | 8/2007 | Souk et al. ............... 349/65 |
| 2007/0274099 | A1* | 11/2007 | Tai et al. ............... 362/610 |
| 2008/0030650 | A1* | 2/2008 | Kitagawa et al. ............. 349/65 |
| 2008/0084709 | A1* | 4/2008 | Li et al. ............... 362/616 |

FOREIGN PATENT DOCUMENTS

JP    2001210122 A  *  8/2001
* cited by examiner

*Primary Examiner* — Michelle R Connelly Cushwa
(74) *Attorney, Agent, or Firm* — Morgan, Lewis & Bockius LLP (57) ABSTRACT

A backlight assembly for a display panel includes a light pipe that is divided into a plurality of horizontal portions, a light source including a plurality of selectively illuminated lamps arranged at lateral sides of each of the horizontal portions for emitting light into the light pipe, a plurality of diffusion surfaces, each of the diffusion surfaces being provided on a selected area of a respective one of the plurality of the horizontal portions, wherein each of the diffusion surfaces causes light to be emitted from the selected area of the respective horizontal portion when the light pipe is illuminated by the lamp associated therewith.

22 Claims, 7 Drawing Sheets

BACKLIGHT ASSEMBLY AND A LIQUID CRYSTAL DISPLAY DEVICE USING THE SAME

BACKGROUND OF THE INVENTION

1. Field of the Invention

The present invention relates to a backlight assembly and a display device using the same, and more particularly, to a backlight assembly for a thin portable liquid crystal display (LCD) device, which is capable of selectively lighting up different screen areas of the portable LCD device without increasing the thickness of the portable LCD device.

2. Discussion of the Related Art

With rapid development of information technology, flat panel display devices are in great demand because of their superior characteristics such as thin profile, light weight, and low power consumption. Among those flat panel display devices, liquid crystal display (LCD) devices having excellent color reproduction are being aggressively researched and developed.

The LCD device includes an LCD panel having a thin film transistor (TFT) substrate, a color filter substrate and a liquid crystal layer disposed therebetween. Since the LCD panel does not emit light by itself, the LCD device includes a backlight assembly at a rear side of the LCD panel as a light source for providing light. The transmittance of the light generated from the backlight assembly is adjusted according to an alignment of the liquid crystal layer. The LCD panel and the backlight assembly are accommodated in a chassis of the LCD device. Depending on a location of the light source, the backlight assembly may be classified as an edge-type or direct-type backlight assembly. The edge-type backlight assembly is provided with a light source at a lateral side of a light guiding plate and is typically used for relatively small sized LCDs. The edge-type backlight assembly provides high light uniformity and good endurance and is suitable for use in thin profile LCDs, such as lap tops, portable TVs and DVD players.

Figure 1:
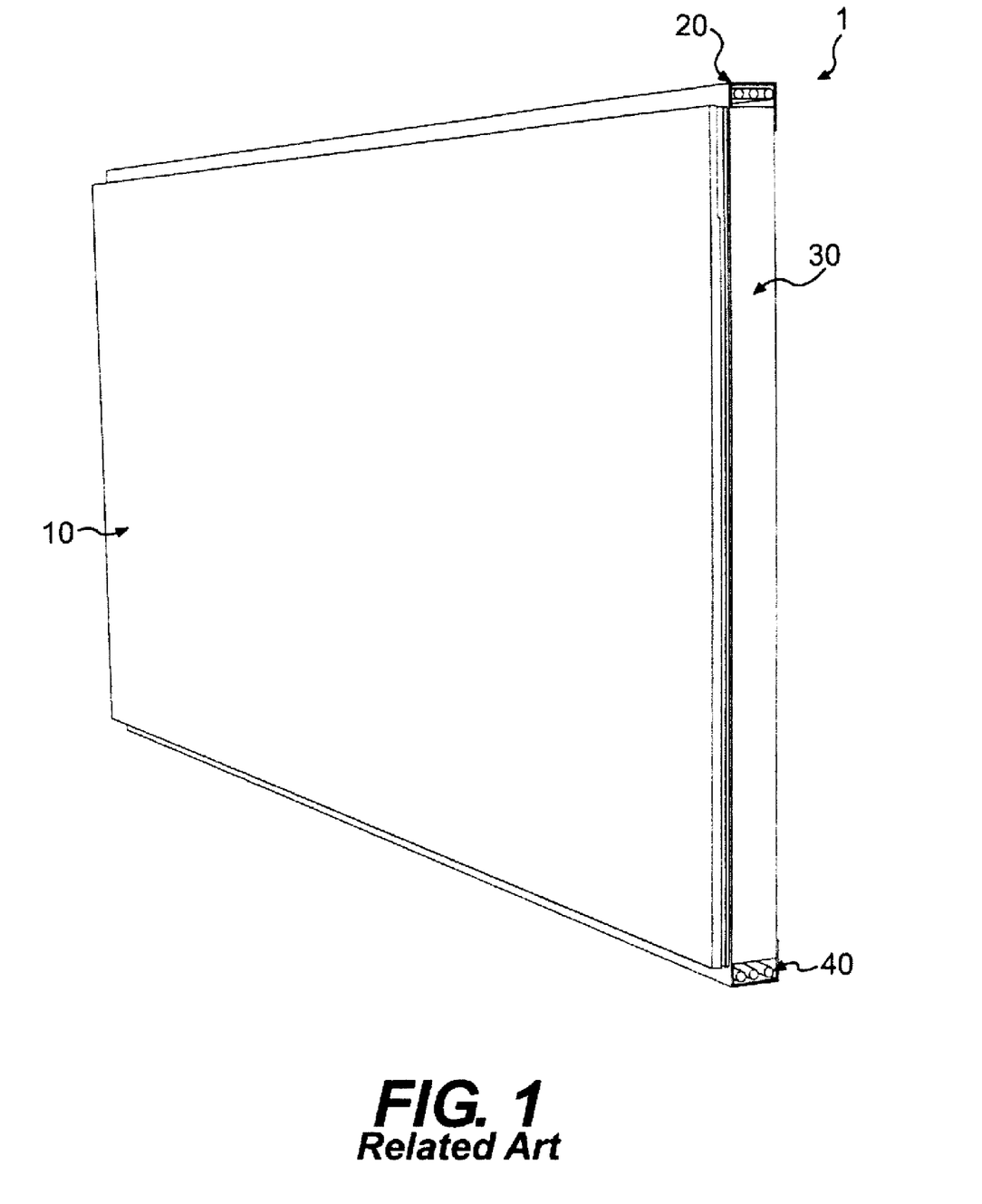
FIG. 1 is a view schematically illustrating a liquid crystal display (LCD) device having a backlight assembly according to the related art.
Figure 2:
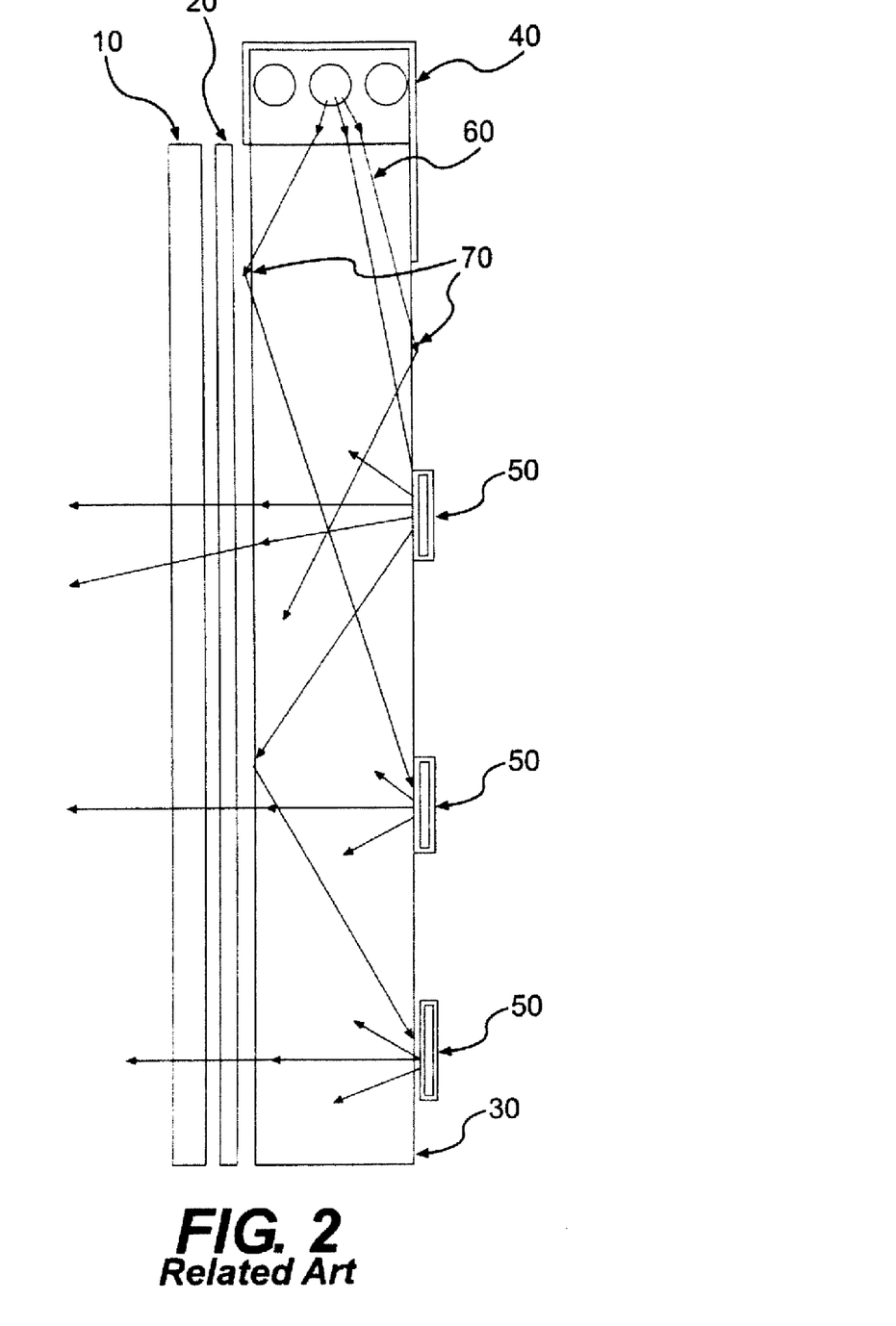
FIG. 2 schematically illustrates a vertical section of the related art LCD device of FIG. 1.

Hereinafter, an LCD device with a backlight assembly according to the related art will be described with reference to FIGS. 1 and 2. FIG. 1 is a view schematically illustrating a related art LCD device 1, and FIG. 2 schematically illustrates a vertical section of the related art LCD device 1 of FIG. 1. Referring to FIGS. 1 and 2, the related art LCD device 1 includes an LCD panel 10, a light filter layer 20 arranged behind the LCD panel 10, a light guide plate 30 arranged behind the light filter layer 20, and a light source 40 arranged laterally at the side of the light guide plate 30. The light guide plate 30 may have a thickness usually from 2 mm to more than 10 mm. The light guide plate 30 may be made of a transparent plastic material. The light source 40 may include one or a plurality of lamps.

As shown in FIG. 2, there are a plurality of diffusion lines or surfaces 50 painted on a rear surface of the light guide plate 30. These diffusion lines or surfaces 50 serve to diffuse light, which is emitted from the light source 40 and then guided by the light pipes of the light guide plate 30. When the light source 40 turns ON to emit light beams 60 through the edge of the light guide plate 30, the light beams 60 bounce inside the light guide plate 30 until they hit the diffusion lines or surfaces 50 painted on the rear surface of the light guide plate 30. Some of the diffused light beams 60 will go through a front surface of the light guide plate 30 to be guided toward the LCD panel 10, when the angles between the light beams 60 and the perpendicular of the front surface are small enough.

Moreover, the reference numeral 70 denotes that the light beams 60 make specular reflection inside the light guide plate 30.

The LCD panel 10 includes a plurality of the pixels (not shown) arranged in a matrix of rows (lines) and columns. The pixels are "refreshed" line by line. Since changing a pixel state from ON to OFF takes time, if the back light is ON at all times, it can cause some undesirable picture artifacts. For this reason, it would be good to turn off the light in the area of the screen of the LCD panel 10, in which the pixels are being "refreshed".

It is also possible to create a software program in a TV using the LCD panel 10, which analyzes the image to decide if all areas of the picture need full brightness or if the back light for some areas can be turned off. This can be an energy saving feature for the TV, but it means that some lamps of the light source can be turned off independently of the other lamps.

In the direct-type backlight assembly, a light source is arranged right behind a screen of the LCD panel, and therefore can be designed and controlled to light up different parts of the screen of the LCD panel independently. However, this manner of mounting the light source in the direct-type backlight assembly may objectively increase the thickness of the LCD device, which is not desirable for portable LCD devices, such as lap tops, portable TVs, and the like. On the other hand, the related art LCD device using the edge-type backlight assembly cannot selectively illuminate areas of the screen of the LCD device.

SUMMARY OF THE INVENTION

Accordingly, the present invention is directed to a backlight assembly and an LCD device using the same which substantially obviate one or more problems due to limitations and disadvantages of the related art.

An object of the present invention is to provide a backlight assembly for an LCD device, which is capable of selectively illuminating areas of the screen of the LCD device.

Another object of the present invention is to provide a backlight assembly for an LCD device, which is capable of selectively illuminating areas of the screen, thereby reducing or cancelling undesirable artifacts displayed on the screen of the LCD device.

Another object of the present invention is to provide a backlight assembly for an LCD device with lower energy consumption by providing different lighting energy for different parts of the screen depending on the image contents displayed on the LCD device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display (LCD) device includes an LCD panel having a screen with a plurality of displaying areas, a light filter layer provided behind the LCD panel, a light guide assembly provided behind the light filter layer, the light guide assembly including a light pipe that is divided into a plurality of horizontal portions, a light source including a plurality of selectively illuminated lamps arranged at lateral sides of each of the horizontal portions for emitting light into the light pipe, a plurality of diffusion surfaces, each of the diffusion surfaces being provided on a selected area of a respective one of the plurality of the horizontal portions, wherein each of the diffusion surfaces causes light to be emitted from the selected area of the respective horizontal portion when the light pipe is illuminated by the lamp associated therewith.

In another aspect of the present invention, a backlight assembly for a display panel includes a light pipe that is divided into a plurality of horizontal portions, a light source including a plurality of selectively illuminated lamps arranged at lateral sides of each of the horizontal portions for emitting light into the light pipe, a plurality of diffusion surfaces, each of the diffusion surfaces being provided on a selected area of a respective one of the plurality of the horizontal portions, wherein each of the diffusion surfaces causes light to be emitted from the selected area of the respective horizontal portion when the light pipe is illuminated by the lamp associated therewith.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
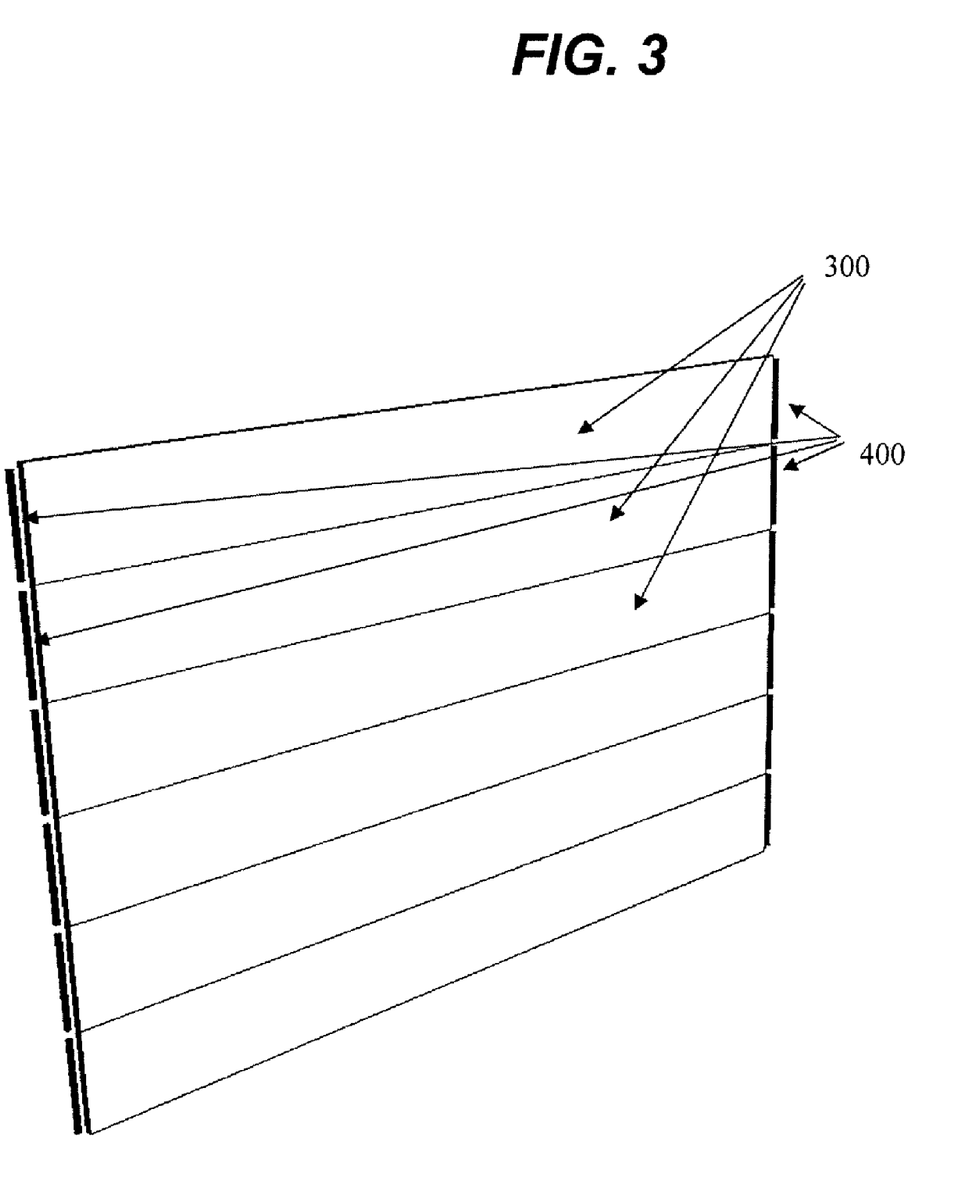
FIG. 3 is a view schematically illustrating a light pipe configuration of the backlight assembly of the LCD device according to a first exemplary embodiment of the present invention.

FIG. 3 is a view schematically illustrating a light pipe configuration of the backlight assembly of the LCD device according to a first exemplary embodiment of the present invention. Referring to FIG. 3, the LCD device of the first exemplary embodiment includes a big light pipe that is divided into a plurality of light guide plates 300 arranged behind an LCD panel (10 of FIG. 2), and a plurality of light sources 400 that are each arranged laterally at two ends of each of the plurality of light guide plates 300. The plurality of light plates 300 may be made of a transparent plastic material, and each may be formed as a horizontal portion. Also, the plurality of lamps 400 may be provided with different types and powers depending on the image contents to be displayed or the light plates 300 with which they are associated. Moreover, the plurality of light guide plates 300 may be formed to have their ends different in width.

Figure 4:
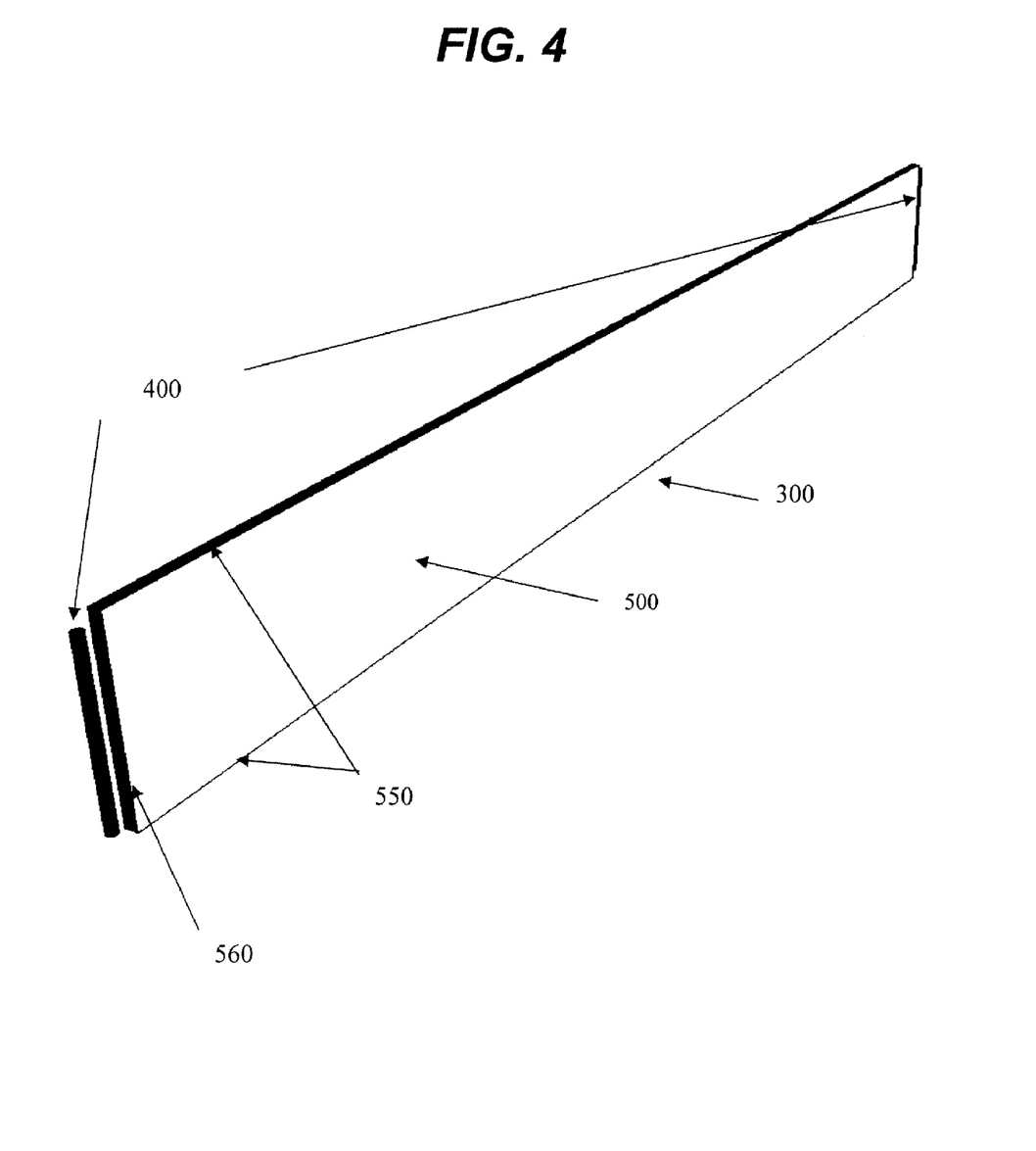
FIG. 4 is a view schematically illustrating one horizontal portion of the light pipe of the backlight assembly of the LCD device of FIG. 3 according to the first embodiment of the present invention.

FIG. 4 is a view schematically illustrating one horizontal portion of the light pipe of the backlight assembly of the LCD device of FIG. 3 according to the first embodiment of the present invention. As shown in FIG. 4, each horizontal portion of the light guide plates 300 has its back side partially or totally covered by a diffusion surface 500. In this exemplary embodiment, the diffusion surface 500 is formed to fully cover a back side of the horizontal portion 300. Also, each horizontal portion 300 includes a top edge and a bottom edge which may be formed with high gloss polish or may be covered with a reflective coating 550. The reflective coating 550 may be applied to cover the entire surface of the top and bottom edges, or may be applied to leave a portion near the front side of the horizontal portion 300 uncovered so as to avoid sharp transition from one lighted area to the other. Moreover, each horizontal portion 300 includes side edges 560 facing the light source 400. The side edges 560 are not covered with any reflective or diffusion coating. When the plurality of lamps 400 selectively turn ON and emit light beams, the diffusion surface 500 on the horizontal portion 300 can serve to selectively diffuse the light beams. Thus, the diffused light beams further pass through the light filter layer (20 of FIG. 2) to selectively illuminate the LCD panel 10 (of FIG. 2).

According to the first exemplary embodiment, since the above-described arrangement can illuminate different areas of the screen of the LCD panel 10 independently by selective energization of the plurality of lamps 400, the undesirable artifacts attached to the LCD panel 10 can be reduced or canceled. Also, when compared with the LCD device 1 of the related art, less energy can be used because the light lamps 400 can be chosen with different power to illuminate the different areas of the LCD panel 10.

Figure 5:
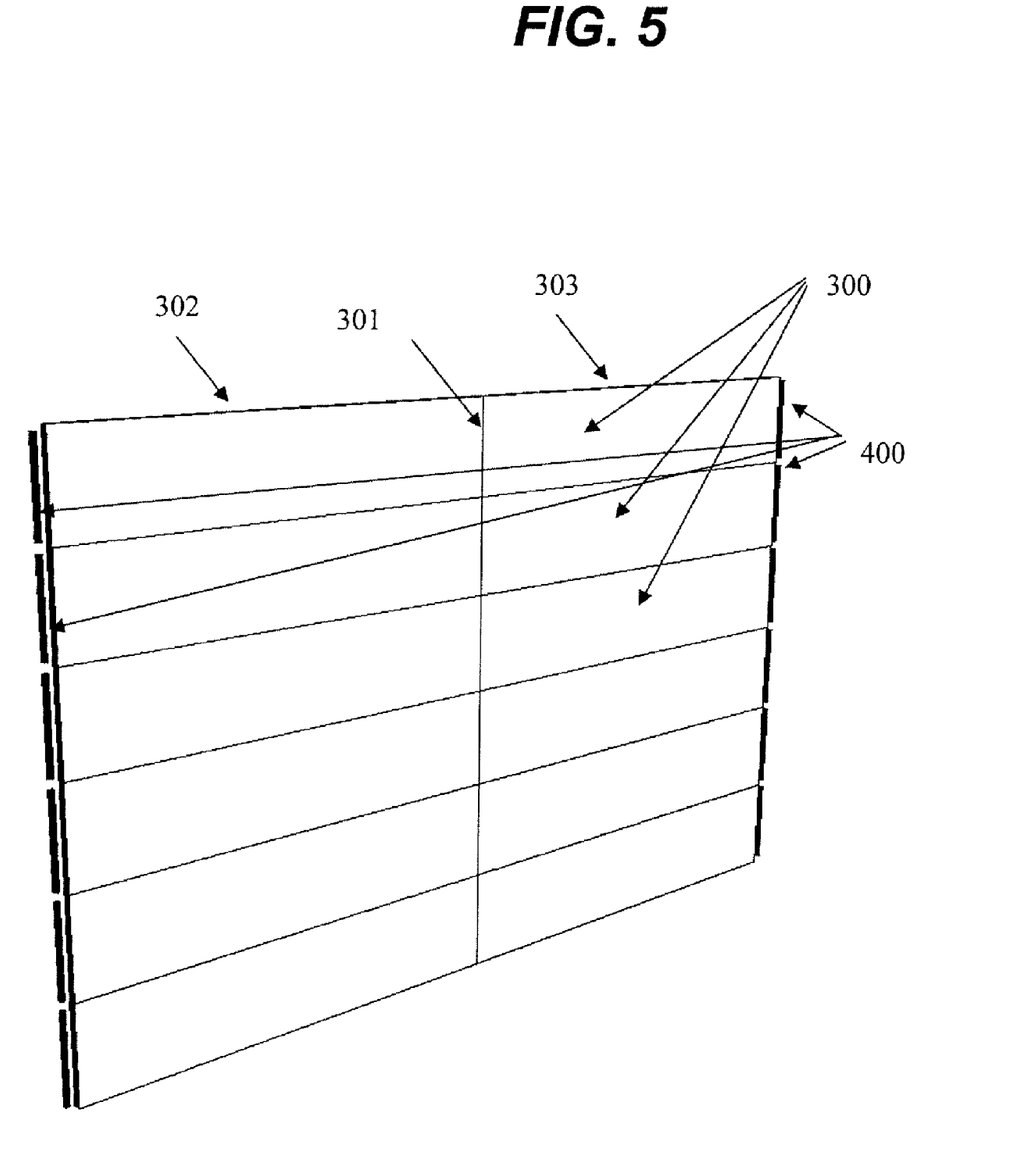
FIG. 5 is a view schematically illustrating a light pipe configuration of the backlight assembly of the LCD device according to a second exemplary embodiment of the present invention.

FIG. 5 is a view schematically illustrating a light pipe configuration of the backlight assembly of the LCD device according to a second exemplary embodiment of the present invention. As shown in FIG. 5, the LCD device of the second exemplary embodiment includes a plurality of light guide plates 300 arranged behind an LCD panel 10 (of FIG. 2), and a plurality of light sources 400 that are each arranged laterally at two ends of each of the plurality of light guide plates 300. The plurality of light guide plates 300 are each divided in a center 301 so as to form left portions 302 and right portions 303. According to such a structure of the second exemplary embodiment, the left portions 302 and the right portions 303 can illuminate independently, thereby doubling the amount of areas of the screen of the LCD panel 10 (of FIG. 2) which can be lighted independently.

Figure 6:
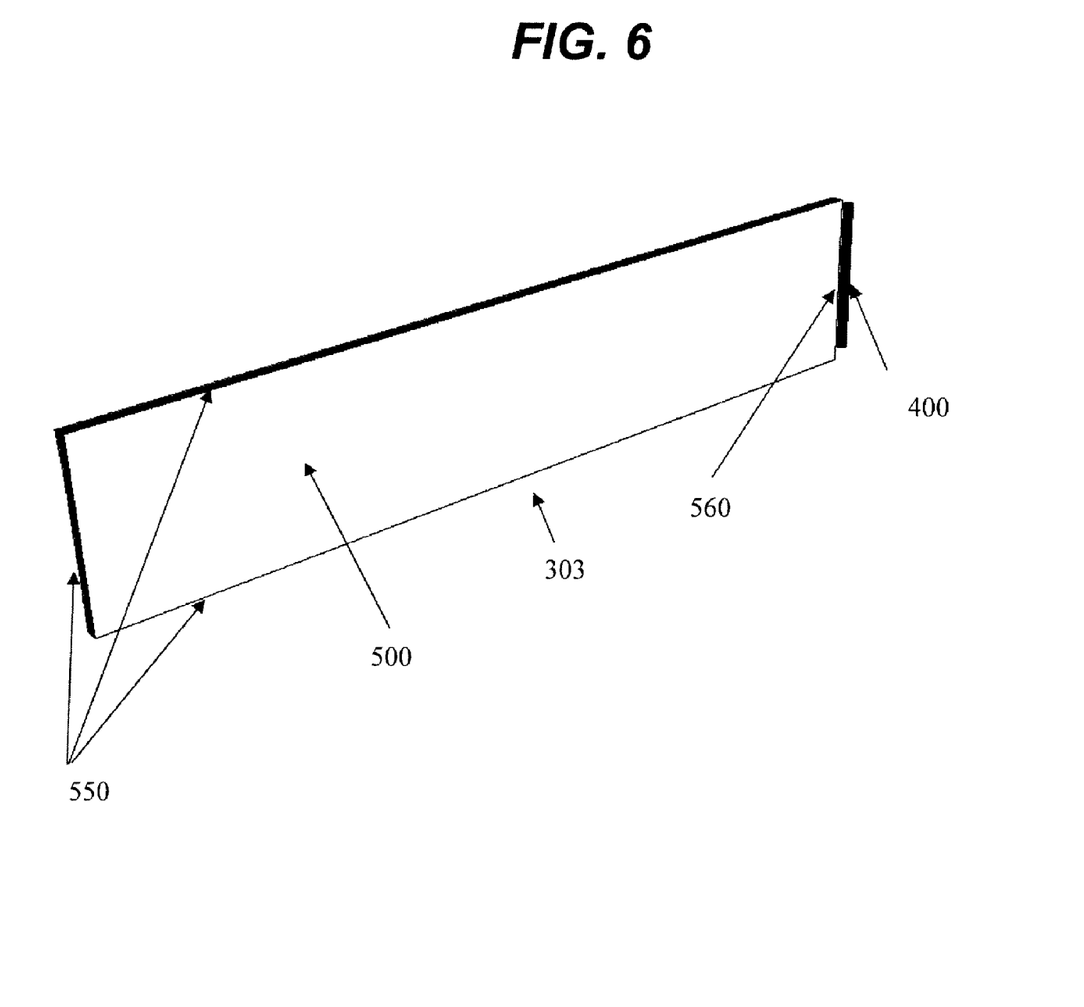
FIG. 6 is a view schematically illustrating a portion of the light pipe configuration of the backlight assembly of the LCD device of FIG. 5 according to the second exemplary embodiment of the present invention.

FIG. 6 is a view schematically illustrating a right portion 303 of the light pipe configuration of the backlight assembly of the LCD device of FIG. 5 according to the second exemplary embodiment of the present invention. As shown in FIG. 6, the right portion 303 has its back side partially or totally covered by a diffusion surface 500. In this exemplary embodiment, the diffusion surface 500 is formed to fully cover a back side of the horizontal portion 303. Also, the horizontal portion 303 includes top edge, a bottom edge and middle edge. The top, bottom and middle edges of the horizontal portion 303 may be formed with high gloss polish or may be covered with a reflective coating 550. The reflective coating 550 may be applied to cover the entire surfaces of the top, bottom and middle edges, or may be applied to leave a portion near the front side of the horizontal portion 303 uncovered so as to avoid sharp transition from one lighted area to the other. Moreover, the horizontal portion 303 includes a side edge 560 that faces the light source 400. The side edge 560 is not covered with any reflective or diffusion coating. When the plurality of lamps 400 selectively turn ON and emit light beams, the diffusion surfaces 500 on the horizontal portions 303 can serve to selectively diffuse the light beams. Thus, the diffused light beams further pass through the light filter layer 20 (of FIG. 2) to selectively illuminate the LCD panel 10 (of FIG. 2).

According to the second exemplary embodiment, since the above-described arrangement is capable of illuminating different areas of the screen of the LCD panel independently, the undesirable artifacts attached to the LCD panel can be reduced or canceled by using the backlight assembly with different lighting configurations of the second exemplary embodiment. Also, energy consumption can be reduced by using the backlight assembly having lamps with different lighting powers for different areas of the screen of the LCD device depending on the image contents to be displayed.

Figure 7:
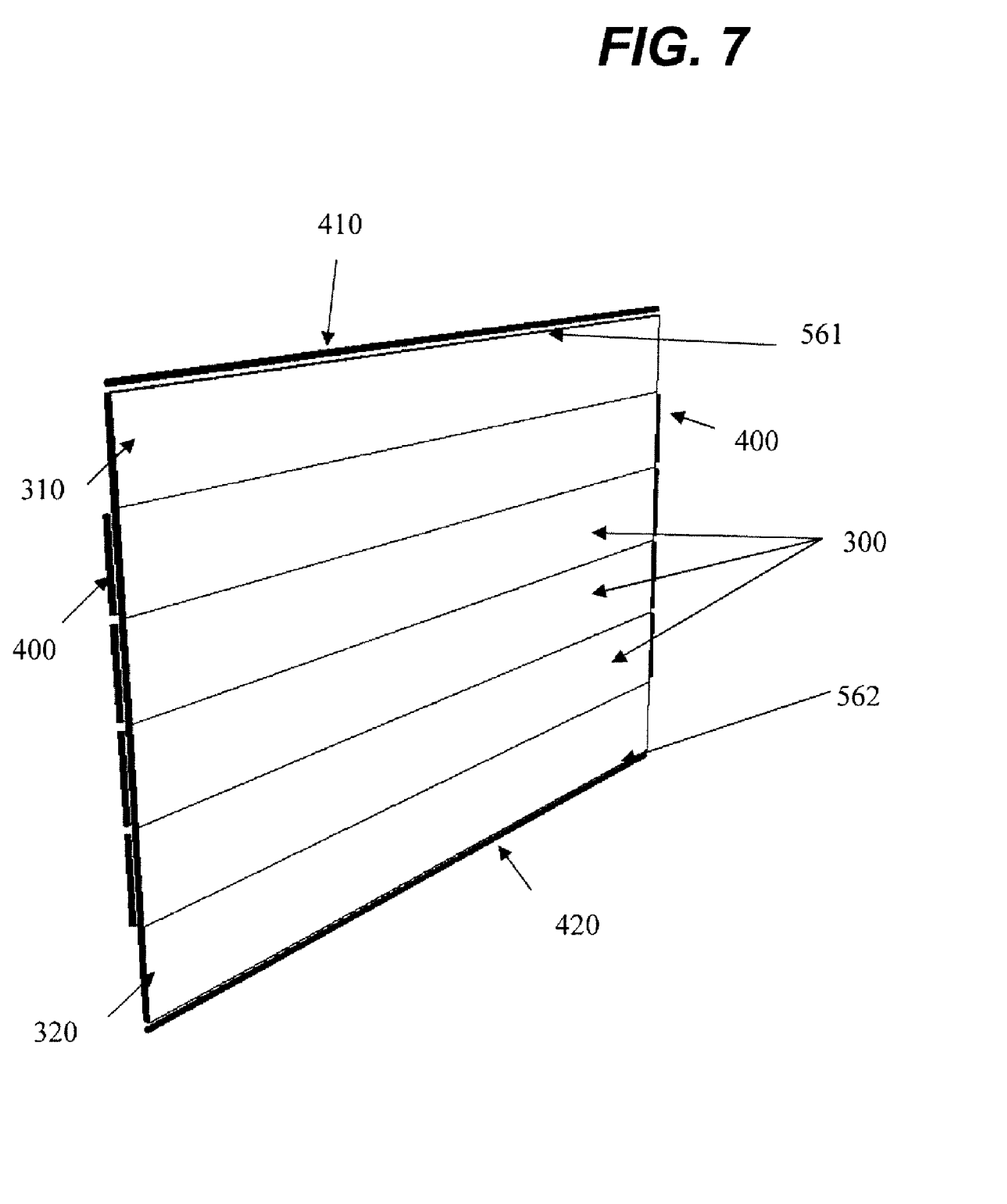
FIG. 7 is a view schematically illustrating a light pipe configuration of the backlight assembly of the LCD device according to a third exemplary embodiment of the present invention.

FIG. 7 is a view schematically illustrating a light pipe configuration of the backlight assembly of the LCD device according to a third exemplary embodiment of the present invention. As shown in FIG. 7, the LCD device of the third exemplary embodiment includes a big light pipe that is divided into a plurality of light guide plates 300, 310 and 320 arranged behind the LCD panel 10 (of FIG. 2). The plurality of light plates 300, 310 and 320 may be made of a transparent plastic material, and may be each formed as a horizontal portion. The light guide plate 310 is a top horizontal portion, and the light guide plate 320 a bottom horizontal portion. A plurality of light sources 400 are each arranged laterally at two ends of each of the plurality of light guide plates 300.

The top horizontal portion 310 has a top edge facing a light source 410, and the bottom horizontal portion 320 has a bottom edge facing a light source 420. The top edge of the top horizontal portion is not provided with any reflective or diffusion coating, and the bottom horizontal portion is also not provided with any reflective or diffusion coating. Moreover, the light sources 410 and 420 may each further include a plurality of light lamps, which may be provided with different types and powers depending on the image contents to be displayed or the light plates 310 and 320 with which they are associated. The plurality of lamps 400 may also be provided with different types and powers depending on the image contents to be displayed or the light plates 300 with which they are associated. Moreover, the plurality of light guide plates 300, 310 and 320 may be formed to have their side edges different in width.

The third exemplary embodiment is similar to the first exemplary embodiment except that the light source 410 is arranged on the top edge for the top horizontal portion 310 and the light source 420 is arranged on the bottom edge for the bottom horizontal portion 320. When the lamps 400, 410 and 420 selectively turn ON and emit light beams, the diffusion surfaces 500 (of FIG. 4) on the horizontal portions 300, 310 and 320 can serve to selectively diffuse the light beams. Thus, the diffused light beams further pass through the light filter layer 20 (of FIG. 2) to selectively illuminate the LCD panel 10 (of FIG. 2).

According to the third exemplary embodiment, since the above-described arrangement is capable of illuminating different areas of the screen of the LCD panel independently, the undesirable artifacts attached to the LCD panel can be reduced or canceled by using the backlight assembly with different lighting configurations of the second exemplary embodiment. Also, energy consumption can be reduced by using the backlight assembly having lamps with different lighting powers for different areas of the screen of the LCD device depending on the image contents to be displayed.

It will be apparent to those skilled in the art that various modifications and variations can be made in the backlight assembly and the LCD device using the backlight assembly of the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device, comprising:
   an LCD panel having a screen with a plurality of displaying areas;
   a light filter layer provided behind the LCD panel;
   a light guide assembly provided behind the light filter layer, the light guide assembly including a light pipe that is divided into a plurality of horizontal portions;
   a light source including a plurality of selectively illuminated lamps arranged at lateral sides of each of the horizontal portions for emitting light into the light pipe;
   a plurality of diffusion surfaces, each of the diffusion surfaces being provided on a selected area of a respective one of the plurality of the horizontal portions,
   wherein each of the diffusion surfaces causes light to be emitted from the selected area of the respective horizontal portion when the light pipe is illuminated by the lamp associated therewith,
   wherein each of the plurality of horizontal portions is further divided at a center thereof to create a left side and a right side so that the left side and the right side can be lighted independently, and
   wherein each center-divided horizontal portion includes a top edge, a bottom edge, a middle edge and a side edge, wherein the top, bottom and middle edges are each a high-gloss polished surface, and the side edge faces the light source and is free of any reflective or diffusion coating.

2. The LCD device according to claim 1, wherein the diffusion surface is formed to fully cover a back side of the horizontal portion.

3. The LCD device according to claim 1, wherein the diffusion surface is formed to partially cover a back side of the horizontal portion.

4. The LCD device according to claim 1, wherein each of the horizontal portions includes a top edge, a bottom edge, and a side edge, wherein the top and bottom edges are each formed with a high gloss polished surface, and the side edge faces the light source and is free of any reflective or diffusion coating.

5. The LCD device according to claim 1, wherein each of the horizontal portions includes a top edge, a bottom edge, and a side edge, wherein the top and bottom edges are each covered with a reflective coating, and the side edge faces the light source and is free of any reflective or diffusion coating.

6. The LCD device according to claim 5, wherein the reflective coating is formed to fully cover the top and bottom edges.

7. The LCD device according to claim 5, wherein the reflective coating is formed to partially cover the top and bottom edges such that the reflective coating leaves a part of top and bottom edges uncovered near a front side of the horizontal portion so as to avoid a sharp light transition from one lighted area to another.

8. The LCD device according to claim 1, wherein each center-divided horizontal portion includes a top edge, a bottom edge, a middle edge and a side edge, wherein the top, bottom and middle edges are each covered with a reflective coating layer, and the side edge faces the light source and is free of any reflective or diffusion coating.

9. The LCD device according to claim 8, wherein the reflective coating is formed to fully cover the top, bottom and middle edges.

10. The LCD device according to claim 8, wherein the reflective coating layer is formed to partially cover the top, bottom and middle edges such that the reflective coating leaves a part of the top, bottom and middle edges uncovered near a front side of the horizontal portion so as to avoid a sharp light transition from one lighted area to another.

11. The LCD device according to claim 1, wherein the light pipe further includes a top horizontal portion and a bottom horizontal portion, such that the top horizontal portion has a top edge without any reflective or diffusion coating, and the bottom horizontal portion has a bottom edge without any reflective or diffusing coating, and wherein the light source includes a top lamp that faces the top edge of the top horizontal portion and a bottom lamp that faces the bottom edge of the bottom horizontal portion.

12. A backlight assembly for a display panel, comprising:
a light pipe that is divided into a plurality of horizontal portions;
a light source including a plurality of selectively illuminated lamps arranged at lateral sides of each of the horizontal portions for emitting light into the light pipe;
a plurality of diffusion surfaces, each of the diffusion surfaces being provided on a selected area of a respective one of the plurality of the horizontal portions,
wherein each of the diffusion surfaces causes light to be emitted from the selected area of the respective horizontal portion when the light pipe is illuminated by the lamp associated therewith,
wherein each of the plurality of horizontal portions is further divided at a center thereof to create a left side and a right side so that the left side and the right side can be lighted independently, and
wherein each center-divided horizontal portion includes a top edge, a bottom edge, a middle edge and a side edge, wherein the top, bottom and middle edges are each a high-gloss polished surface, and the side edge faces the light source and is free of any reflective or diffusion coating.

13. The backlight assembly according to claim 12, wherein the diffusion surface is formed to fully cover a back side of the horizontal portion.

14. The backlight assembly according to claim 12, wherein the diffusion surface is formed to partially cover a back side of the horizontal portion.

15. The backlight assembly according to claim 12, wherein each of the horizontal portions includes a top edge, a bottom edge, and a side edge, wherein the top and bottom edges are each formed with a high gloss polished surface, and the side edge faces the light source and is free of any reflective or diffusion coating.

16. The LCD device according to claim 12, wherein each of the horizontal portions includes a top edge, a bottom edge, and a side edge, wherein the top and bottom edges are each covered with a reflective coating, and the side edge faces the light source and is free of any reflective or diffusion coating.

17. The backlight assembly according to claim 16, wherein the reflective coating is formed to fully cover the top and bottom edges.

18. The backlight assembly according to claim 16, wherein the reflective coating is formed to partially cover the top and bottom edges such that the reflective coating leaves a part of top and bottom edges uncovered near a front side of the horizontal portion so as to avoid a sharp light transition from one lighted area to another.

19. The backlight assembly according to claim 12, wherein each center-divided horizontal portion includes a top edge, a bottom edge, a middle edge and a side edge, wherein the top, bottom and middle edges are each covered with a reflective coating layer, and the side edge faces the light source and is free of any reflective or diffusion coating.

20. The backlight assembly according to claim 19, wherein the reflective coating is formed to fully cover the top, bottom and middle edges.

21. The backlight assembly according to claim 19, wherein the reflective coating layer is formed to partially cover the top, bottom and middle edges such that the reflective coating leaves a part of the top, bottom and middle edges uncovered near a front side of the horizontal portion so as to avoid a sharp light transition from one lighted area to another.

22. The backlight assembly according to claim 12, wherein the light pipe further includes a top horizontal portion and a bottom horizontal portion, such that the top horizontal portion has a top edge without any reflective or diffusion coating, and the bottom horizontal portion has a bottom edge without any reflective or diffusing coating, and wherein the light source includes a top lamp that faces the top edge of the top horizontal portion and a bottom lamp that faces the bottom edge of the bottom horizontal portion.

* * * * *